Dec. 6, 1960 C. G. KESSELRING 2,963,098
HARROW LIFTING MECHANISM
Filed Aug. 17, 1956 2 Sheets-Sheet 1

INVENTOR.
C. G. Kesselring
BY Arthur H. Sturges.
Attorney

United States Patent Office 2,963,098
Patented Dec. 6, 1960

2,963,098
HARROW LIFTING MECHANISM
Carl G. Kesselring, Carson, Iowa
Filed Aug. 17, 1956, Ser. No. 604,678
2 Claims. (Cl. 172—488)

This invention relates to farm machinery and equipment and particularly cultivating devices, and in particular a harrow adapted to be drawn by a tractor in which means is provided for readily elevating the harrow to facilitate turning at the end of a field and also for transportation from one field to another and on a roadway or the like.

The purpose of this invention is to provide means for elevating a harrow to facilitate turning and for transportation in which the elevating means is adapted to be operated from the seat of the tractor to which the harrow is connected.

In the conventional manner of harrowing a farmer drags a harrow across a field and as he arrives at the sides or ends of the field it is necessary to negotiate a turn with a wide sweeping arc damaging, and in some cases eliminating plants at the ends of the rows. In such cases it is necessary to start the turn before the end of the row is reached thereby, at least, disturbing plants a considerable distance from the ends of the rows.

With this thought in mind this invention contemplates a harrow including sections suspended from beams pivotally mounted on a tractor wherein upon elevation of the beams the harrow sections are elevated to positions with the teeth above the ground.

The object of this invention is, therefore, to provide means for mounting a harrow upon a tractor whereby the harrow is adapted to be elevated by conventional means incorporated in the tractor.

Another object of the invention is to provide elevating means for a harrow actuated by a tractor in which sections of the harrow are supported from elements extended from the tractor by chains.

Another important object of the invention is to provide flexible means for supporting a harrow from a tractor wherein the harrow may be elevated without disconnecting the parts.

It is yet another object of the invention to provide means for elevating a harrow connected to a tractor by the tractor to facilitate making turns at the ends of rows so that plants are not damaged in making such turns.

A further object of the invention is to provide elevating means for a harrow connected to a tractor in which beams from which the harrow sections are suspended are secured to an axle forming part of the tractor and adapted to be rotated by conventional means of the tractor.

A still further object of the invention is to provide a harrow adapted to be elevated by a tractor to which the harrow is connected in which the harrow is of a simple and economical construction.

With these and other objects and advantages in view the invention embodies a pair of beams adapted to be secured to ends of an axle rotatably mounted in a tractor, an evener bar connected to a draw-bar of the tractor by a chain, harrow sections flexibly connected to the evener bar, and chains connecting the evener bar and harrow sections to the beams.

Other features and advantages of the invention will appear from the following description taken in connection with the drawings, wherein.

Figure 1:
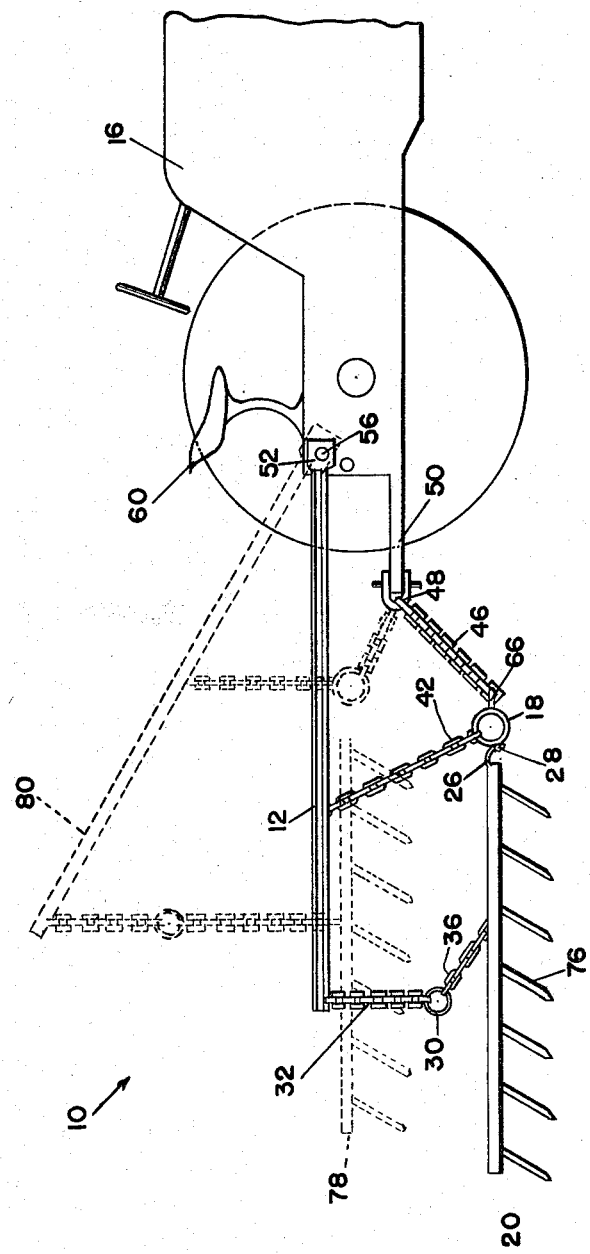
Figure 1 is a side elevational view showing a harrow mounted on the rear portion of a tractor, the harrow being shown in full lines in the operative position, and in an elevated position in broken lines.
Figure 2:
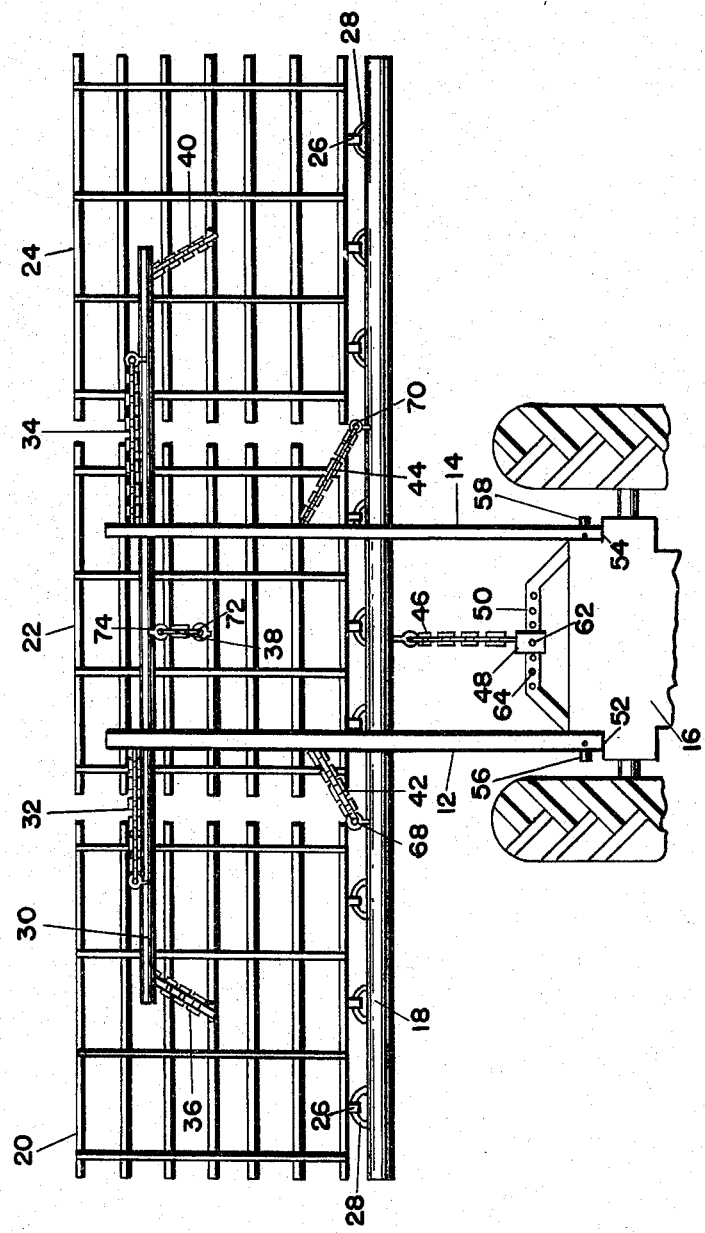
Figure 2 is a plan view of the harrow, also showing the harrow mounted on the rear portion of a tractor, and with the forward portion of the tractor broken away.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 indicating beams, such as I-beams, pivotally mounted on a tractor 16 and extended rearwardly therefrom, numeral 18 an evener bar positioned transversely at the rear of the tractor, numerals 20, 22 and 24 sections of a harrow having hooks 26 on the forward sides and extended through eyes 28 on the evener bar, numeral 30 a support bar, numerals 42 and 44 first chains connecting the evener bar to the beams, providing a first flexible means, numerals 36, 38 and 40, second chains connecting the harrow sections to the support bar providing a second flexible means, numerals 32 and 34 third chains connecting the support bar to trailing ends of the beams providing a third flexible means, and numeral 46 a single chain connecting the evener bar to a clevis 48 on a draw-bar 50 extended from the rear of the tractor.

The leading ends 52 and 54 of the beams 12 and 14 are fixedly secured to ends 56 and 58 of an axle which is rotatably mounted in the tractor housing, and which is adapted to be rotated by power means in the tractor, whereby an operator in the seat 60 of the tractor may readily elevate the beams and harrow sections to the positions indicated by the broken lines in Figure 1.

The clevis 48 is secured by a pin 62 to the draw-bar with the pin positioned in one of the openings 64 in the draw-bar and the opposite end of the chain 46 is secured to the evener bar 18 with an eye 66. The evener bar is also provided with eyes 68 and 70 to which the chains 42 and 44, respectively, are connected. The chains 36, 38, and 40 are connected to the harrow sections with eyes 72 and to the support bar 30 with eyes 74.

With the parts formed and assembled as shown and described the harrow sections, which are provided with teeth 76 are adapted to be elevated to the position indicated by the broken lines 78 as the beams 12 and 14 are rotated upwardly to the position indicated by the broken lines 80, and with the harrow elevated the device may readily be turned at the end of a row or end or side of a field, and plants at the ends of rows will be subjected to the minimum amount of damage.

The sections of the harrow may also be elevated to facilitate moving the harrow from one field to another, and for transportation upon a roadway or the like.

The chains 42 and 44 comprise a first flexible means for connecting the evener bar 18 to the beams 12 and 14, and the chains 36, 38, and 40 comprise a second flexible means connecting the harrow sections 20, 22, and 24 to the support bar 30. The chains 32 and 34 provide a third flexible means which connects the support bar 30 to the beams 12 and 14. With the single chain 46 connecting the evener bar to the tractor, the chains 42 and 44 inclined rearwardly from the evener bar, and the chains 36, 38, and 40 inclined forwardly from the support bar, the forward ends of the harrow sections can be raised a considerable distance before the trailing ends are raised.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. In combination: a plurality of harrow sections adapted to be pulled in a line of draft and disposed side-by-side transversely of said line of draft, an evener bar disposed transversely of said line of draft and spaced from the leading edges of the harrow sections, means pivotally connecting the forward side of said harrow sections to said evener bar for permitting the rearward ends of said harrow sections to swing upwardly and downwardly, a tractor having a power rotatable shaft extended therethrough and also having a draw-bar extended rearwardly therefrom, a single flexible means directly connecting the evener bar to the draw-bar of the tractor along the longitudinal axis of the tractor, spaced beams secured to ends of the rotatable shaft of the tractor and extended rearwardly over the harrow sections, the extended ends of the beams moving upwardly upon rotation of the shaft upwardly at its rearward side, a first flexible means connecting the evener bar to the beams respectively, a support bar extended transversely of said line of draft and across the harrow sections, whereby under the restraint of said single flexible means and said first flexible means the harrow will not skid sideways as the tractor turns but instead describes a graceful arc gradually shifting over transversely of the line of draft until the harrow is again at the usual position approximately centered behind the tractor when the tractor is again going straight, second flexible means connecting the harrow sections to the support bar respectively, and a third flexible means connecting the support bar to the beams respectively, the combined length of the second flexible means and the third flexible means respectively being greater than the length of the first flexible means respectively whereby considerable slack exists in the combined length of the second and third flexible means so that the forward end of the harrow can be raised a substantial distance before the rearward end of the harrow is raised.

2. In a harrow, the combination which comprises an elongated laterally disposed evener bar, a plurality of harrow sections spaced from and positioned to follow the evener bar, means freely connecting the leading sides of the harrow sections to the evener bar whereby trailing sides of the harrow sections are free to swing upwardly and downwardly, laterally spaced longitudinally disposed beams spaced above and positioned over the harrow sections and evener bar and extended forwardly therefrom, a first pair of chains extended from the evener bar to the beams and connected to the beams at points spaced rearwardly from the evener bar, a transversely disposed support bar positioned between the trailing ends of the beams and harrow sections, a second row of chains mounted on the support bar, extended forwardly from said support bar and connected to the harrow sections, respectively, and a third set of chains extended laterally from trailing ends of the beams and connected to the support bar whereby under the restraint of said chains the harrow describes an arc in negotiating a turn gradually shifting transversely until the harrow is in alignment with a towing force, the combined length of the second row of chains and the third set of chains, respectively, being greater than the length of the first pair of chains, whereby considerable slack exists in the combined length of the second row and third set of chains so that the forward end of the harrow can be raised a substantial distance before the trailing end of the harrow is raised.

References Cited in the file of this patent
UNITED STATES PATENTS

| | | |
|---|---|---|
| 1,348,100 | Fernandes | July 27, 1920 |
| 2,591,028 | Udy | Apr. 1, 1952 |

FOREIGN PATENTS

| | | |
|---|---|---|
| 76,341 | Denmark | Sept. 7, 1953 |